Figure 1:
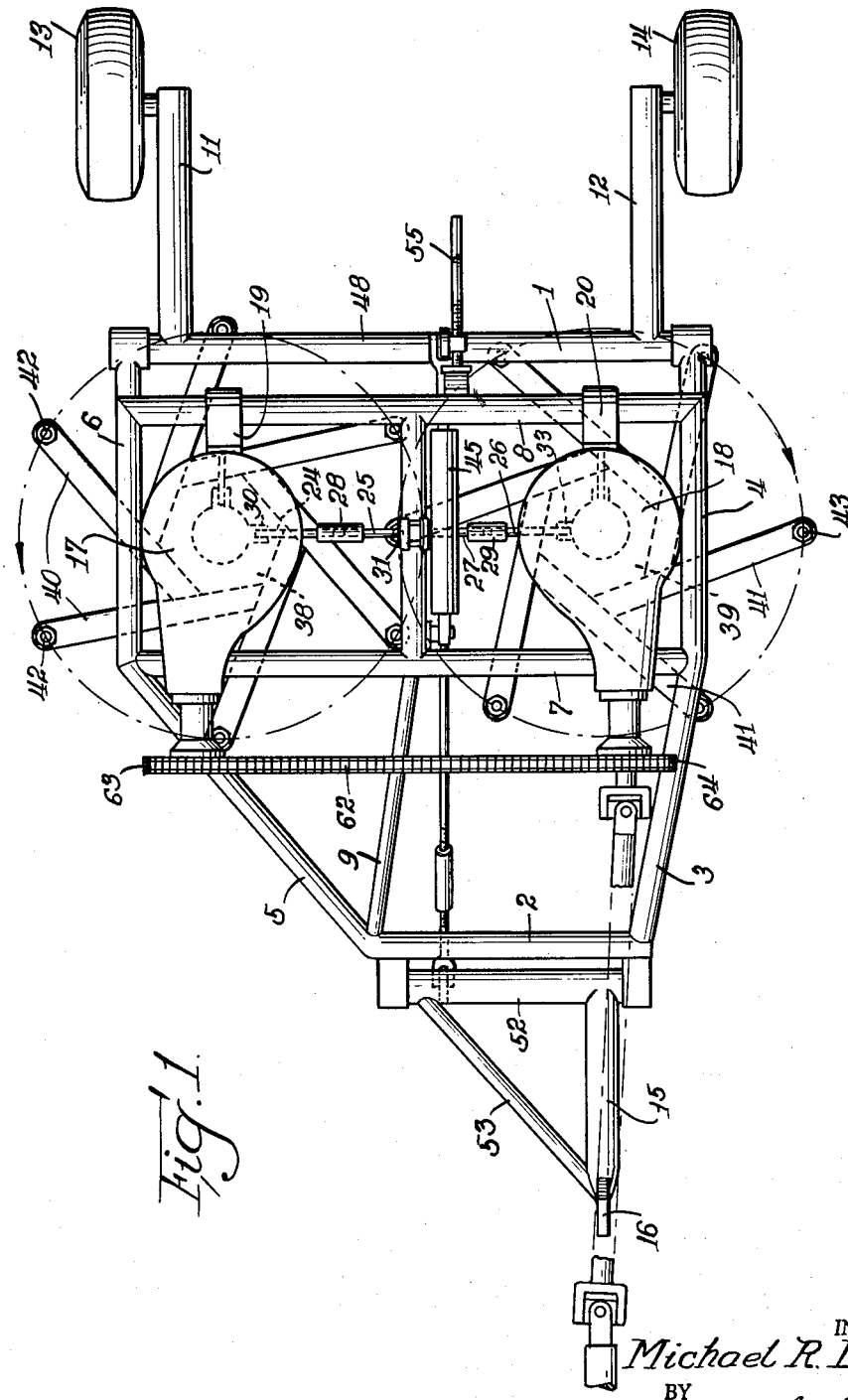

Dec. 24, 1963 M. R. LISTIAK 3,115,190
ROTARY TILLER
Filed April 30, 1962 4 Sheets-Sheet 1

INVENTOR.
Michael R. Listiak
BY

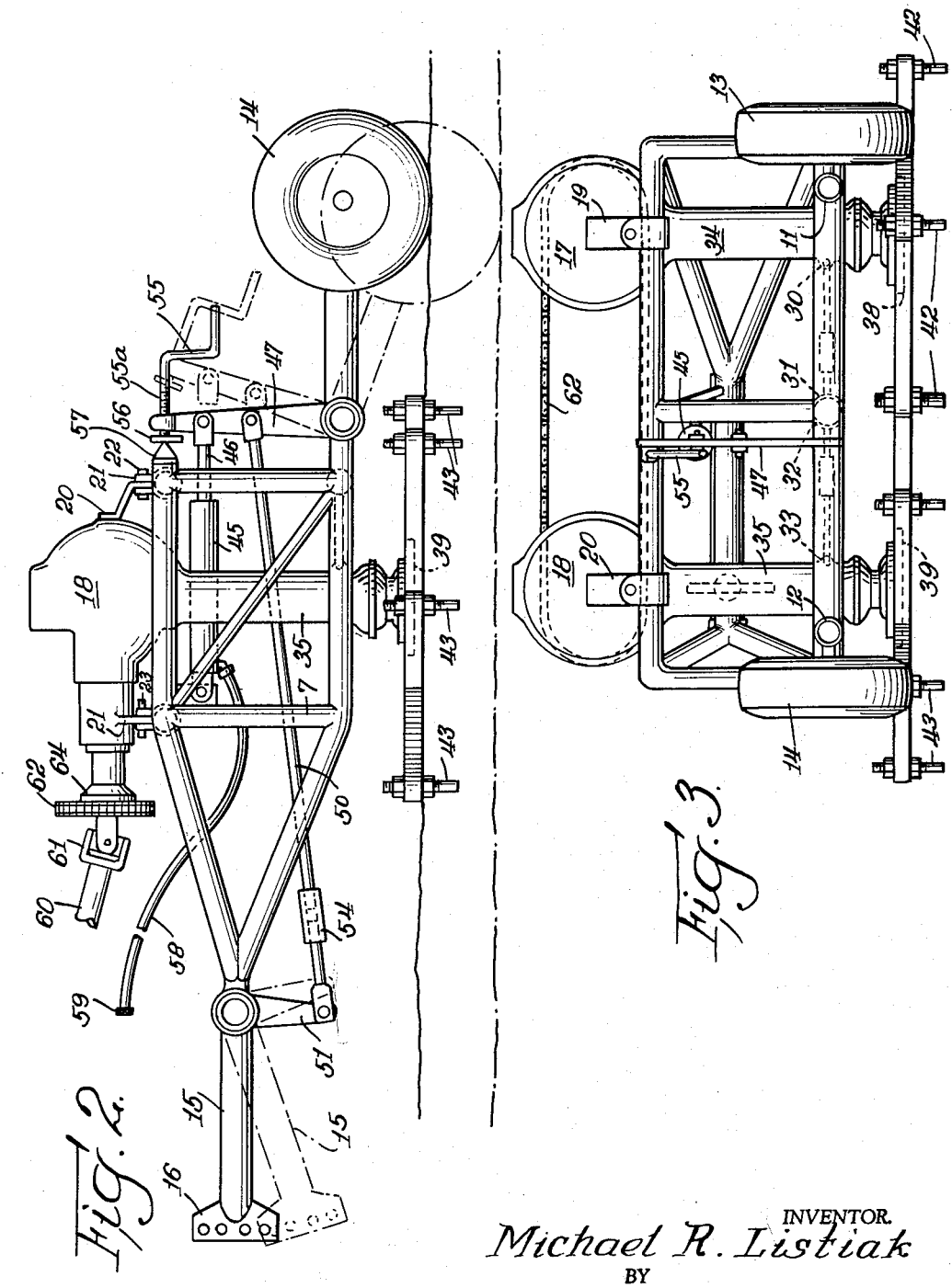

Dec. 24, 1963   M. R. LISTIAK   3,115,190
ROTARY TILLER
Filed April 30, 1962   4 Sheets-Sheet 3
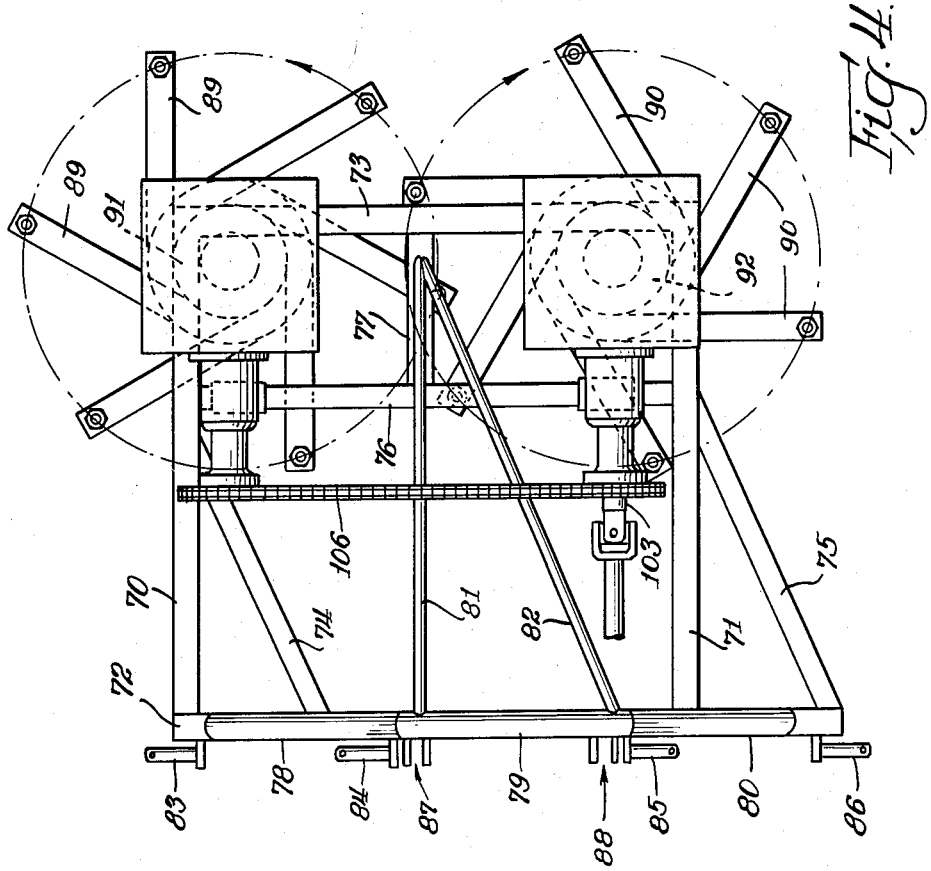
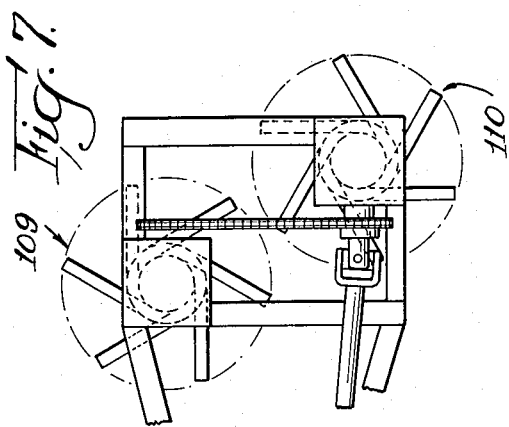
INVENTOR.
Michael R. Listiak
BY
Sam Kurlandsky  Att'y Dec. 24, 1963    M. R. LISTIAK    3,115,190
ROTARY TILLER
Filed April 30, 1962    4 Sheets-Sheet 4
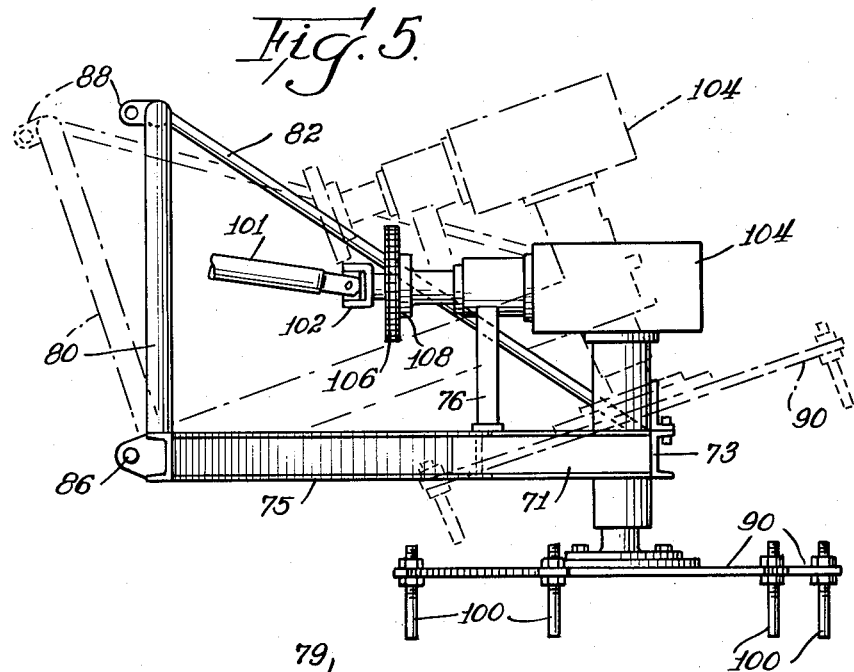
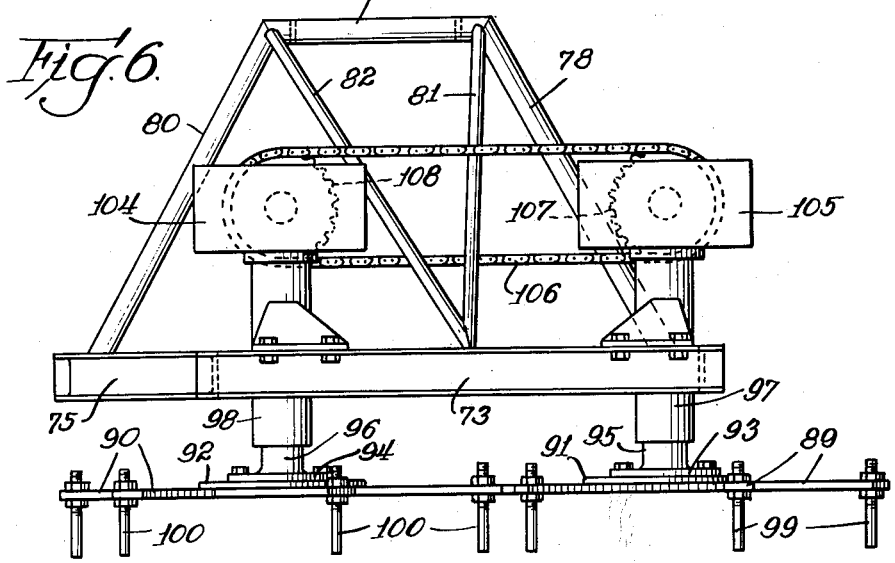
INVENTOR.
Michael R. Listiak
BY
Sam Kurlandsky
Att'y.

United States Patent Office 3,115,190
Patented Dec. 24, 1963

3,115,190
ROTARY TILLER
Michael R. Listiak, 823 Superior St., South Haven, Mich.
Filed Apr. 30, 1962, Ser. No. 191,165
3 Claims. (Cl. 172—49)

This invention relates to cultivating implements and more particularly refers to a vehicle drawn apparatus for cultivating or treating soil.

Rotary tillers have been disclosed in the art. However, they have almost invariably comprised rotating discs having vertical spikes affixed thereto. Devices of this nature have had the draw-back that the supporting disc prevents the vertical spikes from adequately penetrating the soil through vegetation and properly cultivating the soil.

It is an object of the invention to provide a vehicle-powered and vehicle-drawn rotary tiller having vertical tilling blades that are so supported that they are not impeded by the supporting structure from adequately penetrating vegetation and the soil.

It is a further object to provide such an apparatus which is relatively simple and inexpensive to produce.

It is a further object to provide a rotary tiller which may be used to cut a wide swath in the path of the tractor.

It is still further an object to provide such an apparatus which may be easily affixed to standard mounts and hitches of tractors, and which may take its power from the standard power take-off of the tractor.

Other objects and advantages of the invention will become apparent from a study of the following description and the accompanying drawings in which:

FIG. 1 is a top plan view of one form of the device;
FIG. 2 is a side elevational view;
FIG. 3 is a rear elevational view;
FIG. 4 is a top plan view of an alternative form of the invention;
FIG. 5 is a side elevational view of the alternative form;
FIG. 6 is a rear elevational view of the alternative form; and
FIG. 7 is a top plan view of an alternative blade arrangement.

FIGS. 1–3 illustrate the structure of one embodiment of the invention, a form commonly known as a pull-type tiller. The frame is comprised of a rear tubular cross member 1, a front tubular cross member 2, and a lateral connecting frame comprised of lateral members 3, 4, 5, and 6. An elevated platform is provided by transverse tubular members 7 and 8. Reinforcements are provided by tubular members 9 and 10. A trailing wheel assembly is comprised of tubular frame extensions 11 and 12 projecting rearwardly and supporting the wheels 13 and 14.

A tubular draw bar 15 is provided having an adjustable hitch 16 for connecting the tiller to a tractor or other draft vehicle.

Mounted on the frame are a pair of power transmission and tiller arm assemblies. The transmission housings 17, 18 are affixed to the frame by means of rearwardly mounted brackets 19, 20 and hinge brackets 21 in such a manner that the transmission may revolve about an axis drawn through the center of the mounting bolts 22, 23. This arrangement permits the transmission to be moved laterally to a limited degree. The extent of the lateral movement is controlled by means of struts 24, 25, 26 and 27. Each pair of struts is adjustably connected by adjusting sleeves 28, 29 which may be either bolted to the struts or threaded thereon. The struts are affixed to the transmissions and frame by means of brackets 30, 31, 32, and 33.

Cylindrical sleeve housings 34, 35 positioned vertically contain the tiller drive shafts 36, 37 journalled therein. At the end of each shaft are affixed mounting plates 38, 39. A plurality of tiller arms 40, 41 are affixed respectively to each mounting plate. Vertical tilling spikes or blades 42, 43 are journaled through a hole at the end of each tiller arm. Each spike is retained by means of nuts threaded on the spikes on both sides of each tiller arm.

The tiller heads may be raised and lowered by means of a hydraulic cylinder 45 pivotally mounted on the frame at one end and having connecting rod 46 pivotally conrespect to the frame.

The wheels 13 and 14 are supported by a forked structure comprised of a transverse tubular member 48 pivotally mounted on the frame members 4 and 6 for rotation about its mounting axis. Tubular wheel-supporting members 11, 12 are affixed to the transverse tubular member 41 and extend rearwardly to support the wheels 13, 14. The lever arm 47 is affixed at one end to the transverse tubular member 48, and transmits movement from the hydraulic cylinder to raise or lower the wheels with respect to the frame.

In order to maintain the tiller heads parallel to the ground regardless of their elevational position, means is provided for raising or lowering the forward part of the frame in such a manner that the main portion of the frame as well as the transmissions always remain parallel to the ground. This is accomplished by means of a connecting rod 50 pivotally connected at one end to the lever arm 47, and at the other end to a lever arm 51. The lever arm 51 is affixed to a pivotally mounted hitch subassembly comprised of a transverse tubular arm 52 mounted on the frame to rotate about its axis. Affixed to the arm 52 to complete a triangular structure are a draw bar 15 and a diagonal brace 53.

Basically the support for the frame is provided by a pair of bell-crank assemblies. One bell-crank assembly is comprised of the draw bar 15 and the lever arm 51. The other bell-crank is comprised of the lever arm 47, the tubular member 48 and the wheel-supporting members 11, 12. The bell-crank assemblies are connected by the connecting rod 50.

The lifting arrangement is such that when the connecting rod 46 is retracted, the wheels and hitch sub-assembly are in the position indicated by the solid lines in FIG. 2. In this position the tiller heads are in lowered position. When the connecting rod 46 is extended as a result of the introduction of hydraulic fluid into the cylinder 45, the wheels and hitch subassembly assume the position indicated by the broken lines, with the tiller blades in raised position. In this position the tiller blades as well as the frame remain parallel to the ground. Adjustment to establish initially a parallel position is provided by the adjustable collar 54.

The maximum depth to which the tiller blades can be lowered by the reaction of the connecting rod 46 of the hydraulic cylinder 45 is controllable by means of a hand crank 55. The shaft of the crank has a threaded portion 55a which engages a threaded hole provided in the end of the lever arm 47. A disc 56 is affixed to the end of the crank shaft and engages a conical rubber bumper 57 when the lever arm 47 is retracted by the hydraulic cylinder 45. The degree to which the disc 56 is extended or retracted by turning the crank determines the maximum distance to which the tiller heads and blades will be lowered when the connecting rod 46 of the hydraulic cylinder 45 is retracted.

The axis of each transmission is independently adjustable laterally by means of adjustable sleeves 28 and 29, permitting the tiller head to be tilted slightly each for special operations such as hilling.

Hydraulic fluid for operating the cylinder 45 is supplied by means of a flexible conduit 58 having a coupling 59 for connecting to a tractor fitting.

Power for rotating the tiller heads is obtained from the "take-off" of the tractor through a shaft 60 connected to one of the transmissions by means of a universal joint 61. Power is transmitted to the other transmission by suitable means such as a chain drive consisting of a roller chain 62 and sprockets 63, 64.

An alternative embodiment of the invention is shown in FIGS. 4–6.

As shown, the tiller is designed to mount directly on and to be supported by the tractor by means of what is commonly known as a "3-point hitch." Tractors having this type of hitch are commercially available.

The frame for this embodiment of the tiller is comprised of a pair of lateral frame members 70, 71 and transverse frame members 72, 73, all formed from channel steel. Structural rigidity is provided by diagonal members, 74, 75. An additional transverse frame member 76 jointed to the rear frame member 73 by a connecting member 77 serves as a transmission support in addition to the rear frame member 73. A vertical structure for controlling elevation of the tiller is comprised of tubular members 78, 79, and 80 and tubular struts 81, 82.

A two position 3-point hitch arrangement is provided consisting of hinge pins 83, 84, 85 and 86, and flanged hinges 87 and 88. When it is desired to mount the tiller centrally on the tractor, the hinge pins 83 and 85 and flange hinge 87 are utilized. When it is desired to mount the tiller in an offset position, the hinge pins 84 and 86 and flange hinge 88 are utilized.

Each tiller head is comprised of a plurality of radial arms 89, 90 affixed to a mounting plate 91, 92 as by welding. Each mounting plate is in turn bolted to a flange 93, 94 of a vertical drive shaft. Each vertical drive shaft rotates within a shaft housing 97, 98.

At the end of each radial arm is affixed a single vertical spike 99, 100 by a suitable method such as with nuts engaging a threaded portion of each spike. Although the tiller arms 89, 90 have been referred to as "radial arms," it is preferred that they be arranged in "swept-back" position in order to enable them to cast off any vegetation or other debris which may be picked up.

Power for operating the tiller heads is obtained from the tractor through a drive shaft 101 connected by means of a universal joint 102 to the shaft 103 of a transmission 104. Power is also supplied to a second transmission 105 by means of a chain drive compressed of an endless chain 106 and sprockets 107, 108. Each transmission contains a system of reducing gears to transmit power to the vertical drive shafts 95, 96. The transmission system should preferably be so arranged that the two tiller heads rotate in opposite directions to eliminate reaction torque of the machine. The radial arms should also be arranged so that the arms of one tiller head mesh with those of the other, in order to avoid the formation of a center cultivating ridge.

The tiller may be raised and lowered by means of a hydraulic apparatus on the tractor which is attached to the tiller frame at the flange hinges 87 or 88. In FIG. 5 the raised position of the tiller is shown by a broken line.

In FIG. 7 is shown an alternative arrangement of the tiller heads which may be utilized with either of the embodiments described above. As shown, the tiller heads 109, 110 are staggered so that each overlaps the center line, one behind the other. As a result, the formation of a center ridge is prevented, while at the same time the need for synchronizing the two tiller heads is obviated.

Other transmission means known in the art other than those illustrated and described may be utilized. For example, in one known arrangement the drive shaft may be positioned centrally between the transmissions, connected thereto by means of shafts and gears. Because the transmissions are arranged on opposite sides of the drive shaft, rotation in opposing directions by the tiller heads may be easily provided.

The tillers according to the invention, in both embodiments, have many advantages over prior art tillers. The horizontal action of the spiked tiller heads is extremely efficient in uprooting vegetation on loosening the soil. The use of at least two tiller heads side by side enables a wide continuous straight line swath to be cultivated. The use of individual arms instead of dishes or wheels for supporting the spikes enables the tiller blade to get right down to the soil without being impeded in any way by the vegetation. The use of two counter-rotating tiller heads eliminates reaction torque of the machine. By arranging the two heads so that the radial arms mesh a center cultivating ridge is avoided. Moreover when the arms are arranged in swept-back position they can rid themselves of vegetation and avoid becoming tangled or clogged. The tiller arms operate at ground level, and therefore produce a level cultivated swath.

In the pull-type embodiment, an arrangement is provided for maintaining the machine in a fixed attitude with respect to the ground regardless of the depth of tillage. Although the drawings show the pull-type machine in the form designed for offset operation, that is, to operate to one side of the tractor center line, it may also be designed to operate on center.

The 3-point hitch embodiment may be operated either in offset or on center position by choosing the appropriate mounting points.

In both embodiments the tillers operate extremely efficiently and may be easily assembled and repaired from available parts.

Although the present invention has been described in only a few embodiments, other forms and variations of the invention may be practiced by those skilled in the art without departing from the spirit or scope of the invention as defined within the appended claims.

Invention is claimed as follows:

1. A tiller adapted to be mounted on a tractor and to be completely supported thereby during operation comprising a frame, a plurality of hinge pins coaxially arranged affixed to the lower portion of said frame for engaging cooperating hinge means on said tractor, connecting means mounted at an upper portion of said frame for engaging power operated means on said tractor arranged to raise and lower said frame pivotally about said hinge pins, a plurality of tiller assemblies mounted on said frame each comprising a rotatably mounted vertical shaft, a tiller head including a mounting member affixed to the lower end of said shaft, a plurality of substantially horizontally oriented radial arms each being affixed at one end to said mounting member in a swept back position from the direction of rotation of said tiller head and having a downwardly directed vertical tiller blade rigidly affixed to the other end, and means for transmitting power from said tractor to each of said vertical shafts to rotate said tiller heads.

2. A tiller according to claim 1 wherein said tiller heads are sufficiently spaced apart so that the radial arms of one cannot touch the radial arms of the other, and wherein the center of one is mounted rearwardly and laterally with respect to the center of the other in such a manner that the swath defined by one tiller head overlaps the swath defined by the other to a limited degree.

3. A tiller adapted to be mounted on a tractor and to be completely supported thereby during operation comprising a frame, a plurality of hinge pins coaxially arranged affixed to the lower portion of said frame for engaging cooperating hinge means on said tractor, connecting means mounted at an upper portion of said frame for engaging power operated means on said tractor arranged to raise and lower said frame pivotally about said hinge pins, a plurality of tiller assemblies mounted on said frame each comprising a rotatably mounted vertical shaft, a tiller head including a mounting member affixed to the lower end of said shaft, a plurality of substantially horizontally oriented radial arms each being affixed at one end to said mounting member in a swept back position from the direction of rotation of said tiller head and having a downwardly directed vertical tiller blade rigidly affixed to the other end, said tiller assemblies being so mounted with respect to each other that the circle described by the tiller blades of one tiller assembly overlaps the circle described by the tiller blades of the other tiller assembly, and means for transmitting power from said tractor to each of said vertical shafts in such an arrangement that said tiller heads rotate in opposite directions at the same angular velocity, and said tiller heads are so oriented with respect to each other that the outer ends of each radial arm from one tiller head travel in intermeshed relationship with the outer ends of the radial arm of the other tiller head.

References Cited in the file of this patent

UNITED STATES PATENTS

| | | |
|---|---|---|
| 2,545,173 | Shaw | Mar. 13, 1951 |
| 2,651,246 | Peters et al. | Sept. 8, 1953 |
| 2,732,783 | Murphy | Jan. 31, 1956 |
| 2,764,075 | Fowler | Sept. 25, 1956 |
| 2,797,542 | Webster et al. | July 2, 1957 |
| 2,840,971 | Greeson | July 1, 1958 |
| 2,868,305 | Surratt | Jan. 13, 1959 |

FOREIGN PATENTS

| | | |
|---|---|---|
| 619,713 | Great Britain | Mar. 14, 1949 |